United States Patent
Martin et al.

(10) Patent No.: US 9,659,728 B2
(45) Date of Patent: May 23, 2017

(54) SOLID-DIELECTRIC SWITCH INCLUDING A MOLDED VIEWING WINDOW

(71) Applicant: G & W ELECTRIC COMPANY, Bolingbrook, IL (US)

(72) Inventors: Donald Richard Martin, New Lenox, IL (US); Kennedy Amoako Darko, Bolingbrook, IL (US)

(73) Assignee: G & W ELECTRIC COMPANY, Bolingbrook, IL (US)

( * ) Notice: Subject to any disclaimer, the term of this patent is extended or adjusted under 35 U.S.C. 154(b) by 0 days.

(21) Appl. No.: 14/940,471

(22) Filed: Nov. 13, 2015

(65) Prior Publication Data

US 2016/0071671 A1 Mar. 10, 2016

Related U.S. Application Data

(63) Continuation of application No. 13/476,489, filed on May 21, 2012, now Pat. No. 9,216,527.

(Continued)

(51) Int. Cl.
*H01H 33/662* (2006.01)
*H01H 33/666* (2006.01)
(Continued)

(52) U.S. Cl.
CPC . *H01H 33/66207* (2013.01); *B29C 45/14418* (2013.01); *H01H 33/662* (2013.01);
(Continued)

(58) Field of Classification Search
CPC .......... H01H 33/662; H01H 33/66207; H01H 33/6664; B29C 45/14
(Continued)

(56) References Cited

U.S. PATENT DOCUMENTS 3,626,125 A 12/1971 Tonegawa
3,727,109 A 4/1973 Kozlovic
(Continued)

FOREIGN PATENT DOCUMENTS

WO 2009076975 6/2009

OTHER PUBLICATIONS

Vantage Style SF6 Switches, Catalog Vantage08, G&W Electric Co., Sep. 2008, 8 pages.
(Continued)

*Primary Examiner* — Renee Luebke
*Assistant Examiner* — William Bolton
(74) *Attorney, Agent, or Firm* — Michael Best & Friedrich LLP

(57) ABSTRACT

A solid-dielectric switch includes a visible disconnect assembly having an open state and a closed state. A molded housing at least partially encases the visible disconnect assembly. At least a portion of the molded housing forms a molded one-piece wall having an inner surface and an outer surface. An aperture in the molded one-piece wall extends between the inner surface and the outer surface of the wall. A viewing window is disposed in the aperture and molded into the molded wall. The viewing window includes a lens, wherein the viewing window has an outer edge that is embedded within the molded one-piece wall with the outer edge extending into the molded one-piece wall between the inner surface and the outer surface of the molded one-piece wall.

17 Claims, 19 Drawing Sheets

Related U.S. Application Data

(60) Provisional application No. 61/633,429, filed on Feb. 9, 2012.

(51) Int. Cl.
*H01H 9/02* (2006.01)
*B29L 31/34* (2006.01)
*B29C 45/14* (2006.01)

(52) U.S. Cl.
CPC ... *H01H 33/6664* (2013.01); *B29C 45/14434* (2013.01); *B29L 2031/3481* (2013.01); *H01H 2009/0292* (2013.01); *H01H 2033/66223* (2013.01); *H01H 2205/002* (2013.01)

(58) Field of Classification Search
USPC .............................. 218/139, 10, 118; 264/279
See application file for complete search history.

(56) References Cited

U.S. PATENT DOCUMENTS

| | | | |
|---|---|---|---|
| 4,568,804 A | 2/1986 | Luehring | |
| 4,739,291 A | 4/1988 | Lee | |
| 4,910,367 A | 3/1990 | Akers et al. | |
| 5,062,022 A | 10/1991 | Beard et al. | |
| 5,808,258 A | 9/1998 | Luzzi | |
| 5,912,604 A | 6/1999 | Harvey et al. | |
| 6,040,747 A | 3/2000 | Krasser et al. | |
| 6,888,086 B2 * | 5/2005 | Daharsh | H01C 7/12 218/155 |
| 7,304,262 B2 | 12/2007 | Stoving et al. | |
| 7,501,598 B2 | 3/2009 | Stepniak et al. | |
| 7,563,161 B2 | 7/2009 | Perret | |
| 7,579,571 B2 | 8/2009 | Siebens et al. | |
| 2006/0034037 A1 | 2/2006 | Lammers | |
| 2007/0278187 A1 | 12/2007 | Siebens et al. | |
| 2007/0278188 A1 | 12/2007 | Siebens et al. | |
| 2009/0293165 A1 * | 12/2009 | Arnold | A42B 3/226 2/15 |
| 2012/0261384 A1 * | 10/2012 | LaBianco | H01H 33/027 218/118 |

OTHER PUBLICATIONS

Vantage SF6 Switches, Installation, Operation and Maintenance Instructions, G&W Electric Co., Nov. 2009, 30 pages.

Trident Solid Dielectric Switchgear, Catalog, G&W Electric Co., Mar. 2009, 28 pages.

International Search Report and Written Opinion for Application No. PCT/US2012/065271 dated Jan. 31, 2013 (8 pages).

United States Patent Office Final Action for U.S. Appl. No. 13/476,489 dated Jun. 3, 2015 (10 pages).

United States Patent Office Action for U.S. Appl. No. 13/476,489 dated Feb. 9, 2015 (9 pages).

United States Patent Office Action for U.S. Appl. No. 13/476,489 dated Aug. 29, 2014 (6 pages).

* cited by examiner

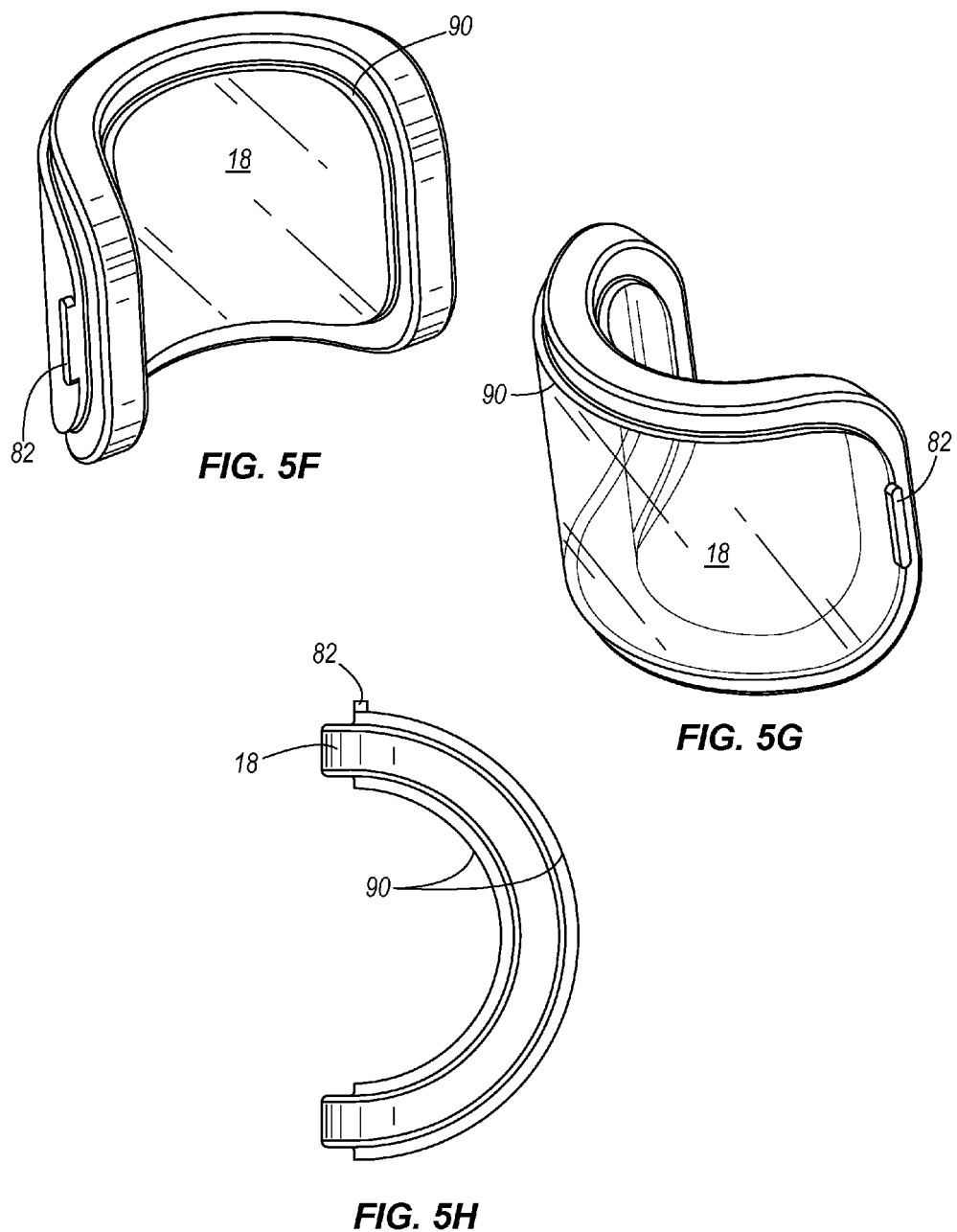

SOLID-DIELECTRIC SWITCH INCLUDING A MOLDED VIEWING WINDOW

RELATED APPLICATIONS

This application claims priority to U.S. Non-Provisional application Ser. No. 13/476,489, filed May 21, 2012 and U.S. Provisional Application No. 61/633,429, filed Feb. 9, 2012, the entire contents of which are hereby incorporated by reference.

BACKGROUND

Integral visible disconnects in oil-based and gas-based switches provide an operator with visual verification of an open circuit. However, the size of these switches is often constrained based on the cost and supply of the oil or gas. Furthermore, the gasses and oils used in these types of switches are often flammable, which creates safety concerns. In addition, the gasses and oils used in the switches have an environmental impact that must be considered when determining whether it is cost-effective and environmentally safe to place a switch in a particular location, such as underground.

SUMMARY

Solid-dielectric switches solve many of the concerns described above relating to oil-based and gas-based switches, and can be safely placed in underground environments. To provide a visible disconnect, existing solid-dielectric switches rely on external devices (e.g., load break elbows). However, safety practices of utilities often require extensive use of personal protective equipment to operate external devices in confined spaces, and some utilities disallow the practice altogether for safety concerns. Therefore, solid-dielectric switches are typically not as regularly used as oil-based or gas-based switches because such switches do not provide an integral visible disconnect.

Accordingly, embodiments of the present invention provide an integral visible disconnect as part of a solid-dielectric switch. The integral disconnect eliminates the need for dangerous external devices, such as load break elbows, to provide a visible disconnect of the distribution circuit. Therefore, one embodiment of the invention provides a solid-dielectric switch including a visible disconnect assembly having an open state and a closed state, a molded housing at least partially encasing the visible disconnect assembly, and a viewing window molded into the molded housing, wherein the visible disconnect is visible through the viewing window.

Another embodiment of the invention provides a method of molding a housing for a solid-dielectric switch. The method includes providing a mold including an external shell and an internal mandrel, the external shell defining external dimensions of a housing of the switch and the internal mandrel defining internal dimensions of the housing. The method also includes providing a viewing window, sealing the viewing window between the external shell and the inner mandrel, and filling the mold with epoxy to mold the lens into the housing.

In another embodiment, a solid-dielectric switch includes a visible disconnect assembly having an open state and a closed state. A molded housing at least partially encases the visible disconnect assembly. At least a portion of the molded housing forms a molded one-piece wall having an inner surface and an outer surface. An aperture in the molded one-piece wall extends between the inner surface and the outer surface of the wall. A viewing window is disposed in the aperture and molded into the molded wall. The viewing window includes a lens, wherein the viewing window has an outer edge that is embedded within the molded one-piece wall with the outer edge extending into the molded one-piece wall between the inner surface and the outer surface of the molded one-piece wall.

In another embodiment, a housing for a solid-dielectric switch with a visible disconnect assembly has an open state and a closed state. The housing includes a molded one-piece wall having an inner surface and an outer surface. An aperture in the molded one-piece wall extends between the inner surface and the outer surface of the wall. A viewing window disposed in the aperture includes a lens. The viewing window has an outer edge that is embedded in the molded one-piece wall with the outer edge extending into the molded one-piece wall between the inner surface and the outer surface of the wall.

Other aspects of the invention will become apparent by consideration of the detailed description and accompanying drawings.

BRIEF DESCRIPTION OF THE DRAWINGS

FIGS. 5F-5H illustrate the viewing window of the switch of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
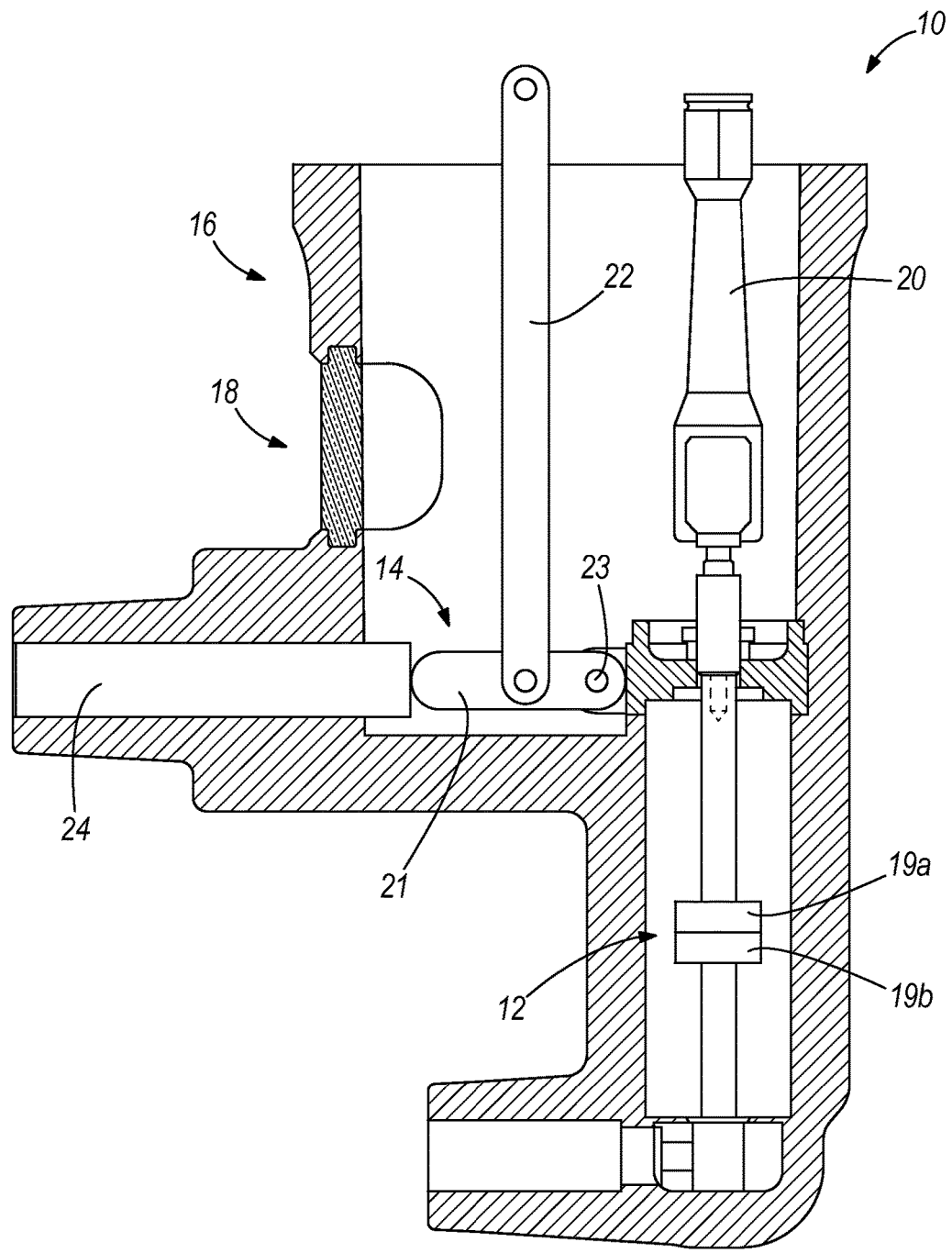
FIG. 1 is a cross-sectional view of a solid-dielectric switch including a visible disconnect assembly and a load-breaking device, with the load-breaking device and the visible disconnect assembly in a closed state.

FIG. 1 illustrates a solid-dielectric switch 10. The switch 10 includes one or more internal components, such as a load breaking device 12 (e.g., a vacuum interrupter) and an integral visible disconnect assembly 14. The switch 10 also includes a molded housing 16 and a generally transparent or translucent viewing window 18 molded into the housing 16. The housing 16 at least partially encases the internal components of the switch 10 (e.g., the vacuum interrupter 12 and the visible disconnect assembly 14). The housing 16 is molded using a rigid material, such as an epoxy. The vacuum interrupter 12 includes two contacts 19a and 19b. When the contacts 19a and 19b are connected (see FIG. 1), the vacuum interrupter 12 is in a closed state and the circuit is closed. When the contacts 19a and 19b are not connected (see FIGS. 2 and 3), the vacuum interrupter 12 is in an open state and the circuit is open. The state of the vacuum interrupter 12 can be changed using a drive mechanism 20 (e.g., an actuator). The drive mechanism 20 can be operated manually or in an automated fashion.

The visible disconnect assembly 14 is connected in series with the vacuum interrupter 12. The visible disconnect assembly 14 illustrated in FIG. 1 includes a knife blade assembly that includes a blade 21 and a lever 22. The lever 22 can be operated manually or in an automated fashion to move the blade 21 between a closed state (see FIG. 1) and an open state (see FIG. 3). For example, in some embodiments, the lever 22 pivots the blade 21 on a pin 23 or other pivoting mechanism between the two states. In the closed state, the blade 21 physically and electrically connects the vacuum interrupter 12 with a source conductor 24. In the open state, the blade 21 physically and electrically disconnects the vacuum interrupter 12 from the source conductor 24. Therefore, the physical position of the blade 21 can be used to visually inspect whether the vacuum interrupter 12 is physically and, consequently, electrically connected to the source conductor 24. Therefore, the physical position of the blade 21 provides visual verification to an operator regarding whether current is flowing through the switch 10.

In some embodiments, external operating handles (not shown) on the switch 10 allow an operator or an automated controller to operate the drive mechanism 20 and the lever 22. To prevent unsafe arcing, an interlock (not shown) between the drive mechanism 20 and the lever 22 allows the visible disconnect to be opened or closed only if the vacuum interrupter 12 is in the open state. For example, the external operating handles associated with the drive mechanism 20 and the lever 22 can be arranged such that the lever 22 can only be operated using the external operating handle (e.g., rotated) when the vacuum interrupter 12 is in the open state.

Figure 2:
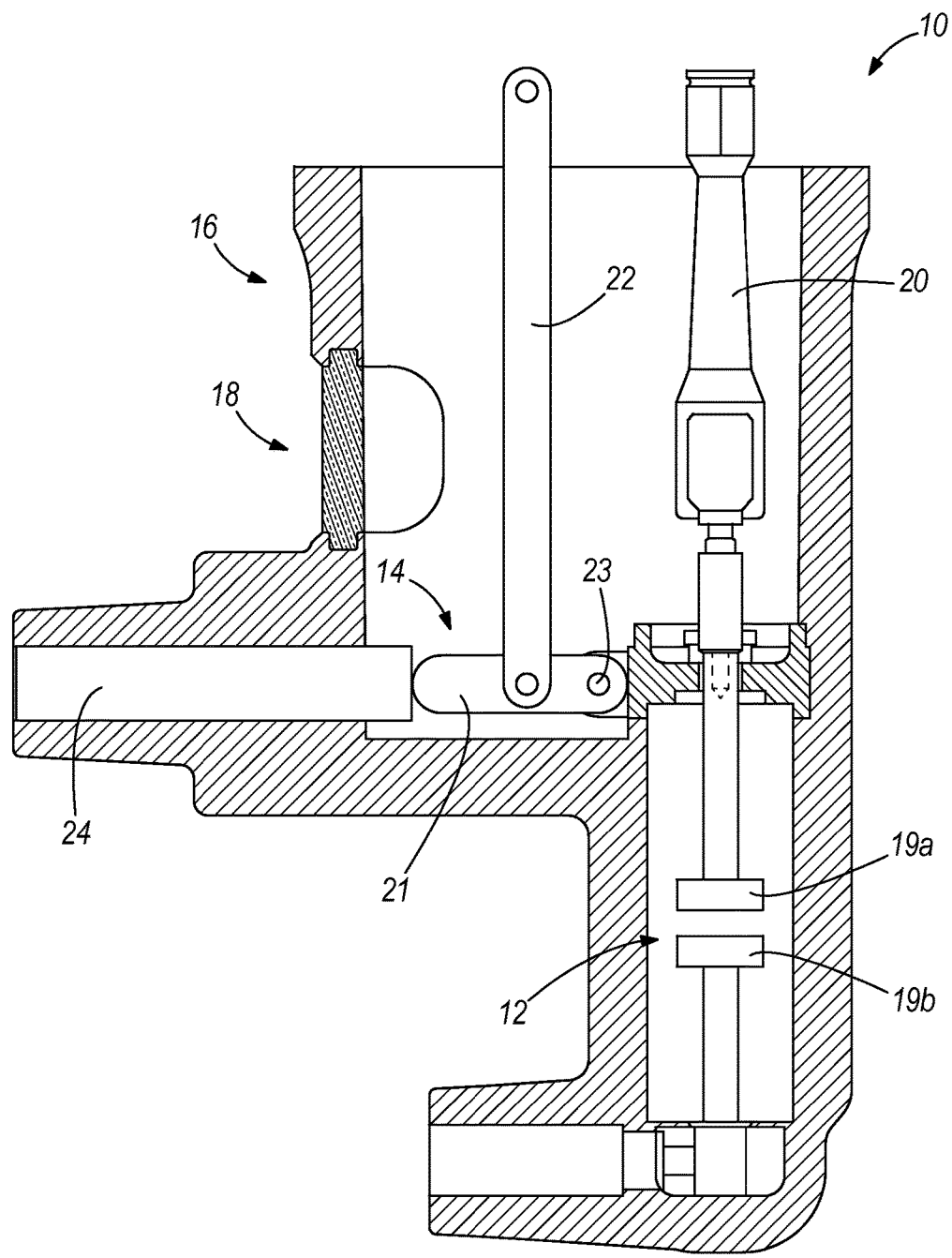
FIG. 2 is a cross-sectional view of the solid-dielectric switch of FIG. 1, with the load-breaking device in an open state and the visible disconnect assembly in a closed state.
Figure 3:
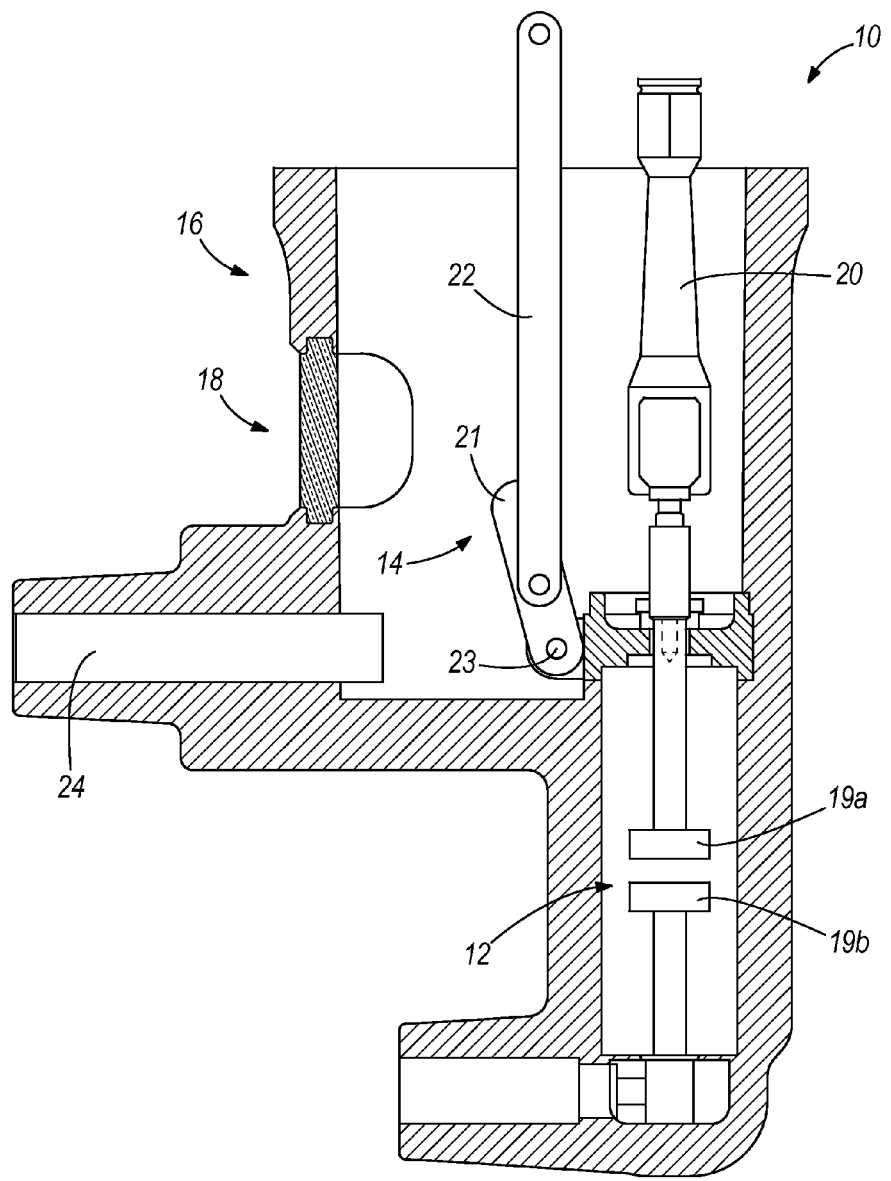
FIG. 3 is a cross-sectional view of the solid-dielectric switch of FIG. 1, with the load-breaking device and the visible disconnect assembly in an open state.

Therefore, before the visible disconnect assembly 14 can be opened, the vacuum interrupter 12 is opened using the drive mechanism 20 (see FIG. 2). After the vacuum interrupter 12 has been opened, the circuit defined by the switch has been interrupted and the state of the visible disconnect assembly 14 can be safely changed. In particular, with the vacuum interrupter 12 open, the visible disconnect assembly 14 can be opened, as shown in FIG. 3, and the open state of the visible disconnect assembly 14 is observable through the viewing window 18.

As noted above, although visible disconnect assemblies and associated viewing windows have been used in gas and oil based switches, solid-dielectric switches have historically not included visible disconnect assemblies as it was unknown how to successfully mold a viewing window into the epoxy housing of a solid-dielectric switch. One difficulty with such molding is that the material of the viewing window must be able to withstand the molding temperatures encountered in epoxy molding. These temperatures can approach approximately 170° Celsius, which is well above the melting point of plastics that are optically clear. Also, the material of the viewing window 18 must also be able to withstand compressions and contractions occurring during the molding process. In addition, the epoxy must be kept off of viewing surfaces of the window, which complicates the molding process. Furthermore, the edge of the viewing window must form a hermetic seal with the epoxy that is also flexible enough to withstand thermal expansions and contractions caused by environmental temperature swings experienced by the switch 10 during use.

In addition, although clear epoxies exist that could be used to form transparent housings, these materials contain pure resin or hardeners and do not contain any filler. The fillers (e.g., silica or alumina), however, are what gives epoxies its strength (e.g., fillers are typically make up approximately 65% to approximately 85% of the material content of an epoxy). Without the fillers, a transparent epoxy lacks the strength necessary for molding a housing of a solid dielectric switch. Similarly, rigid materials, such as an epoxy, do not accommodate the insertion of components into the material after the materials have cured. Therefore, unlike flexible materials (e.g., ethylene propylene diene monomer rubber), a viewing window cannot be inserted into a molded housing constructed from a rigid epoxy after the housing has been formed.

Figure 4:
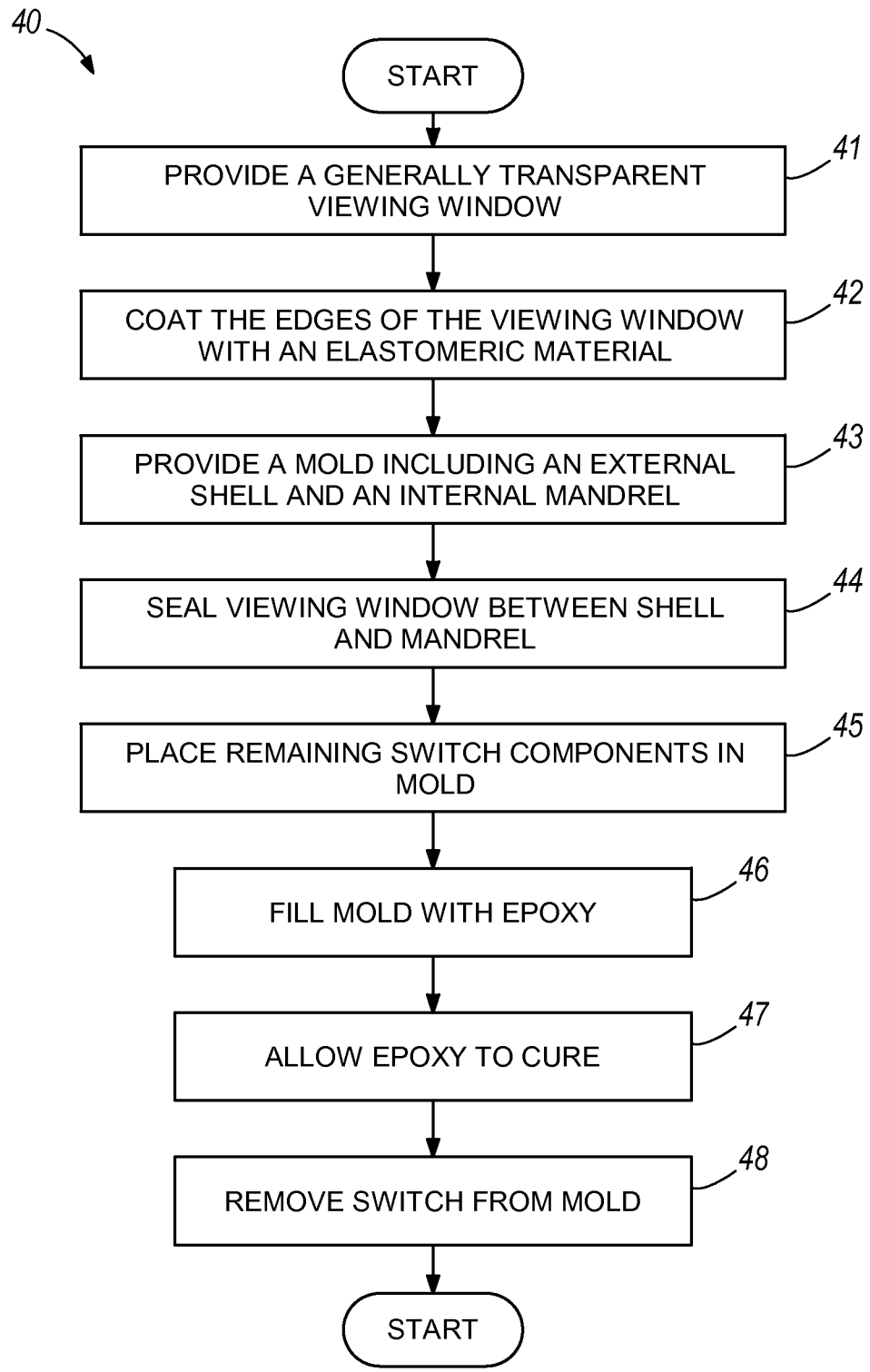
FIG. 4 is a flow chart illustrating a method of molding a housing of the switch of FIG. 1.

FIG. 4 is a flow chart illustrating a method 40 of molding the housing 16 of the switch 10 to account for the above problems associated with molding the viewing window 18 into the housing 16. Accordingly, as shown in FIG. 4, the method 40 includes providing a generally transparent or translucent viewing window 18 that can withstand high molding temperatures (at 41). In some embodiments, a glass is used as the viewing window 18 because glass can withstand high molding temperature. However, other generally transparent materials that can withstand the molding temperatures (e.g., approximately 170° Celsius or greater) can be used as the viewing window 18.

A mold is also provided that includes an external shell 52 and an internal mandrel 50 (see FIGS. 5A-5E) (at 43). The external shell 52 defines the outside dimensions of the housing 16, and the internal mandrel 50 defines the inner surface of the housing 16. Typically, the external shell 52 and a complementary shell (e.g. a mirror image of the shell 52) are brought together to form the mold with the mandrel 50 and other components inside. To prevent epoxy from covering the viewing surfaces of the viewing window 18, the viewing window 18 is held and sealed between the external shell 52 and the mandrel 50 (at 44). To seal the window 18 against these components, a flexible seal can be provided on the mandrel and on the external shell using an elastomer that can withstand the molding temperatures, such as silicone. The seal can include a band 56 that has a circular cross-section like an o-ring and is held in a mating groove in the mandrel 50 and in the external shell 52 (see FIGS. 5A-5E). When the mandrel 50 is placed inside the external shell 52, the viewing window 18 is positioned between the elastomeric bands 56 in the mandrel 50 and the external shell 52, and the bands 56 are compressed and seal against the inner and outer surface of the window 18. Therefore, the bands 56 form a flexible "shutoff" between the mold and the viewing window 18, which prevents epoxy from covering the viewing surfaces of the window 18. The compressible nature of the bands 56 also accommodates the manufacturing tolerances of the window 18 during the molding process.

Also, to ensure a strong yet flexible hermetic seal between the viewing window 18 and the epoxy, the non-viewing surfaces of the window 18 can optionally be coated with an elastomeric material (at 42), such as neoprene or ethylene propylene diene monomer ("EPDM"). The coating of elastomeric material 80 (illustrated in FIG. 5C, for example)

bonds to the epoxy and forms a cushion that accommodates the difference in thermal expansions and contractions between the cured epoxy and the viewing window 18.

Figure 5A:
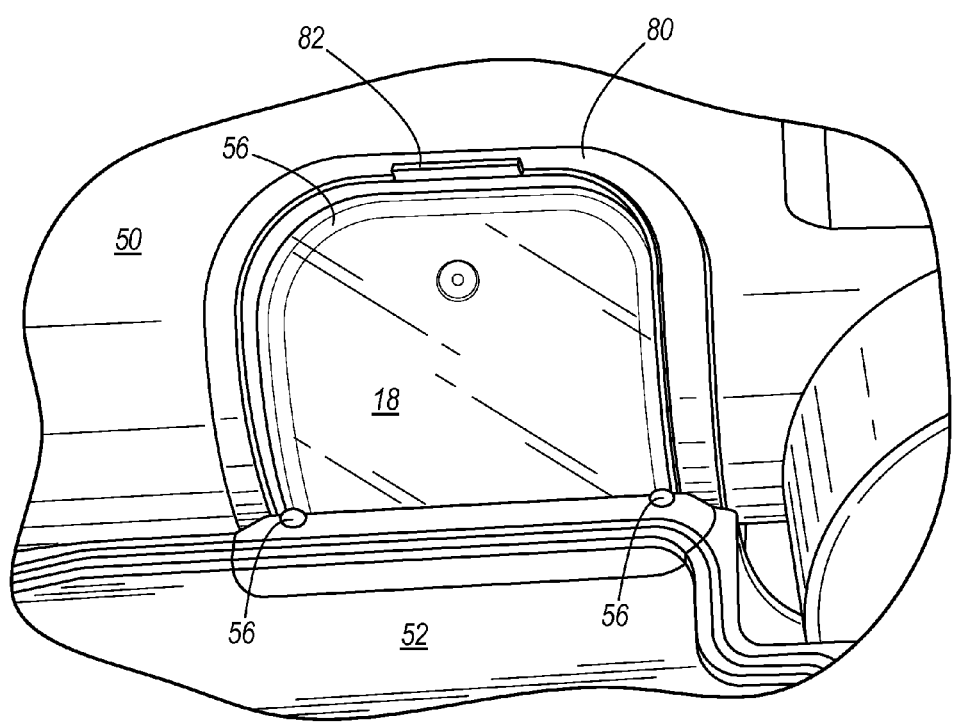
FIGS. 5A-5E, 6A-6D, 7, 8, and 9 are views of the switch of FIG. 1 during the molding process of FIG. 4.
Figure 5B:
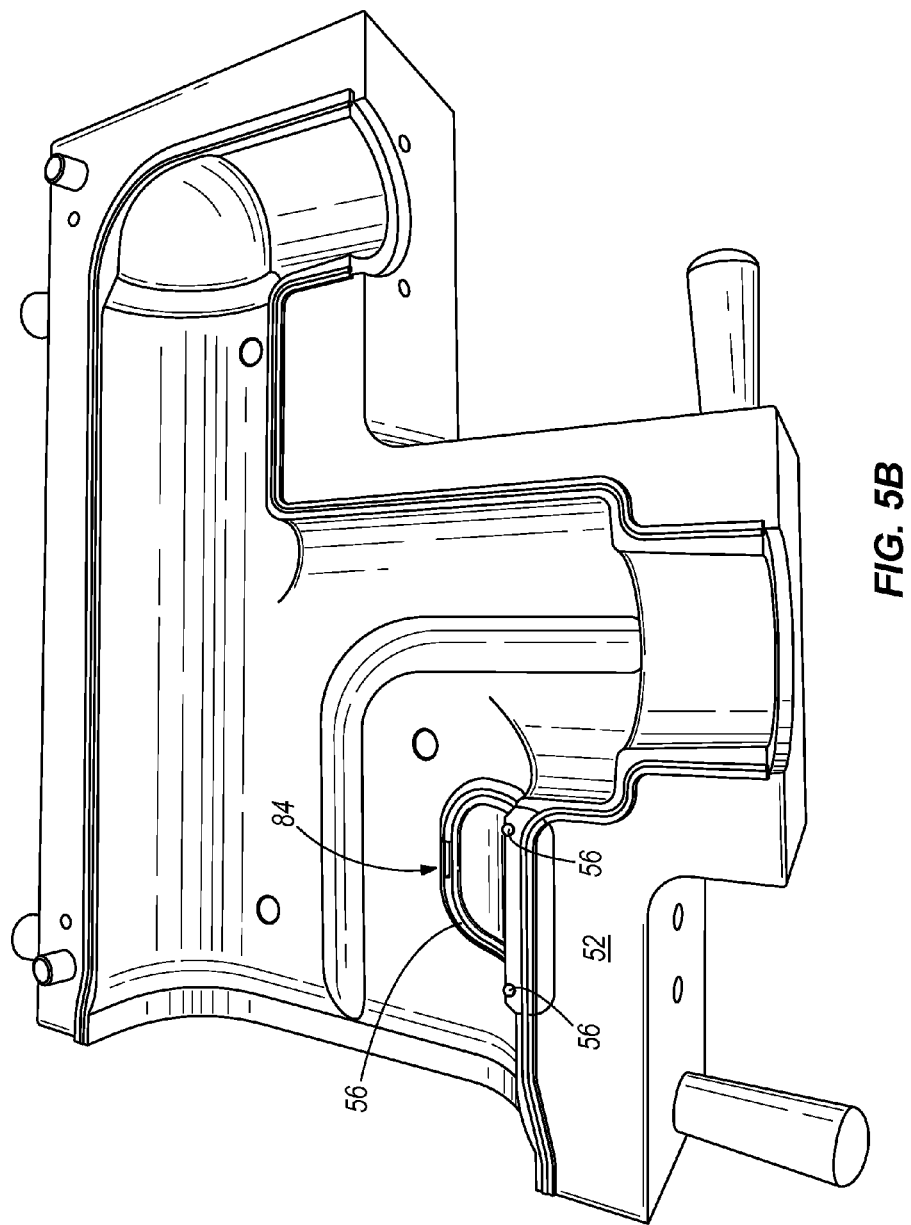
Figure 5C:
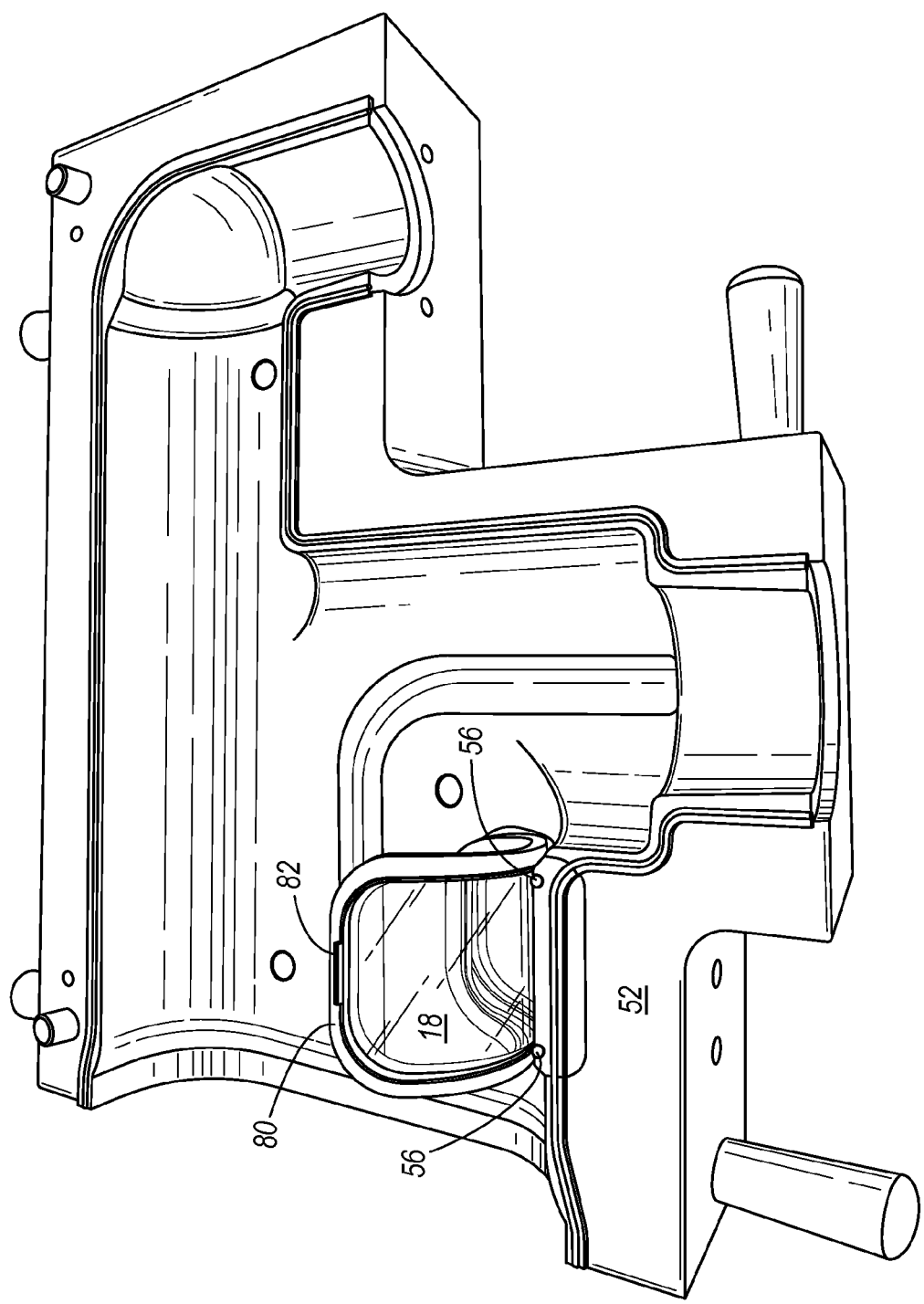
Figure 5D:
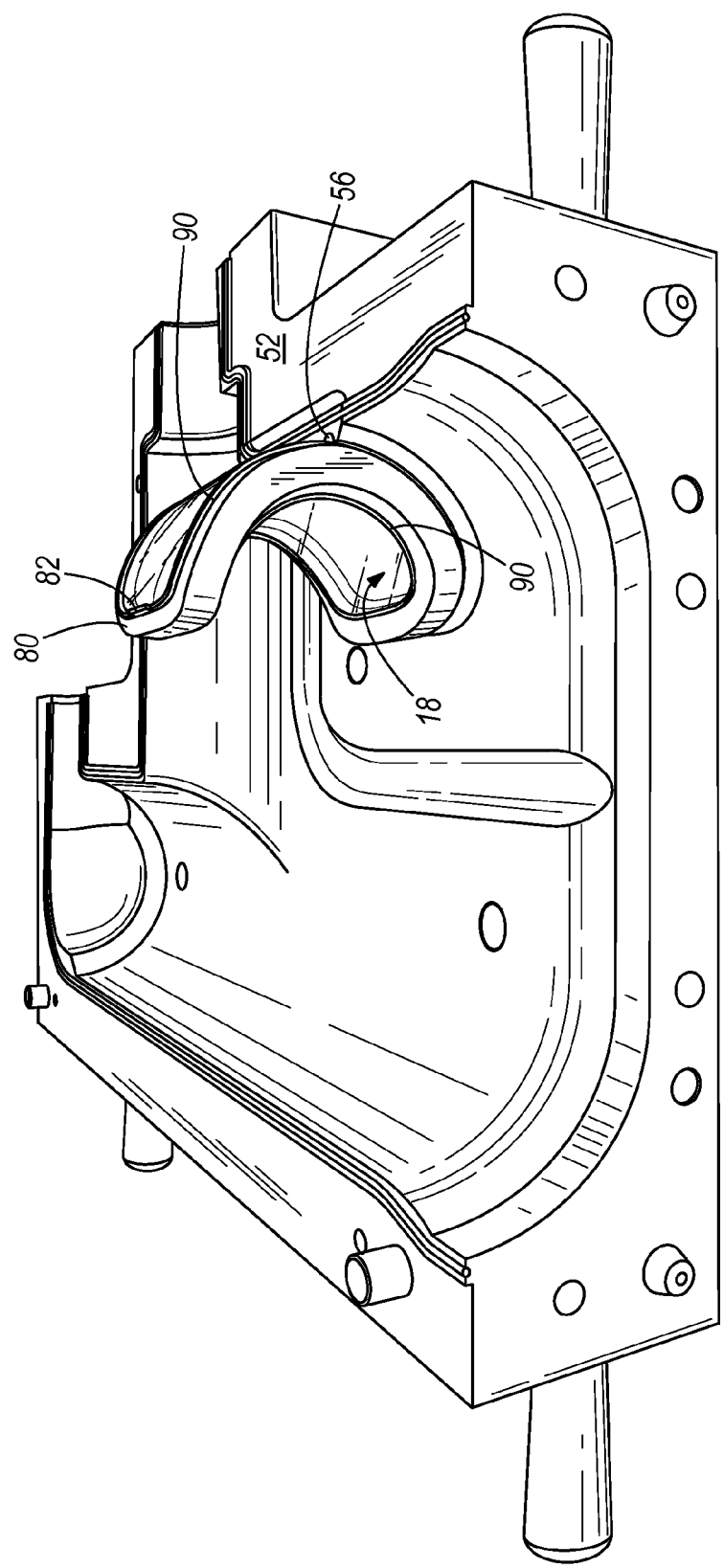
Figure 5E:
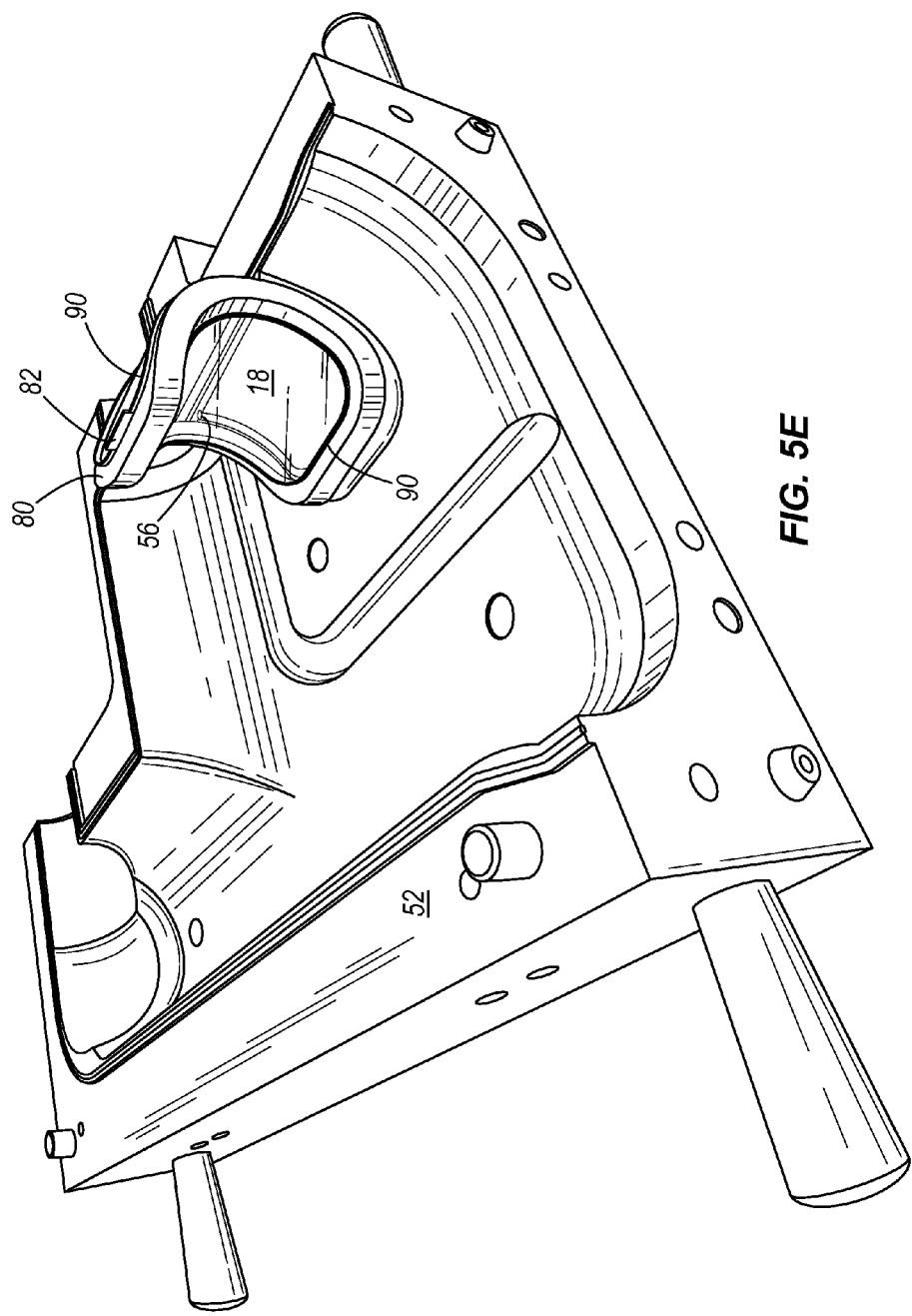
Figure 6A:
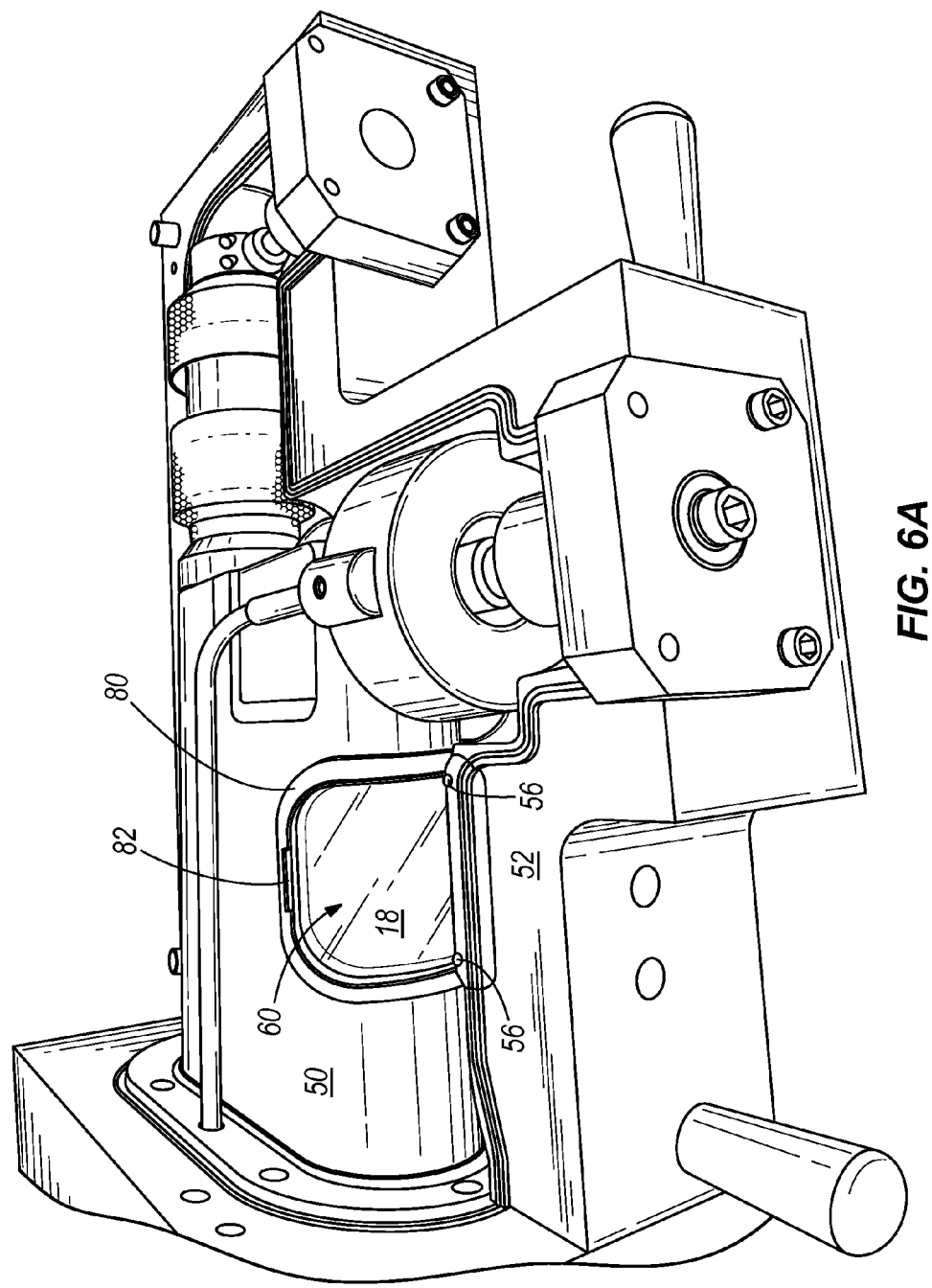
Figure 6B:
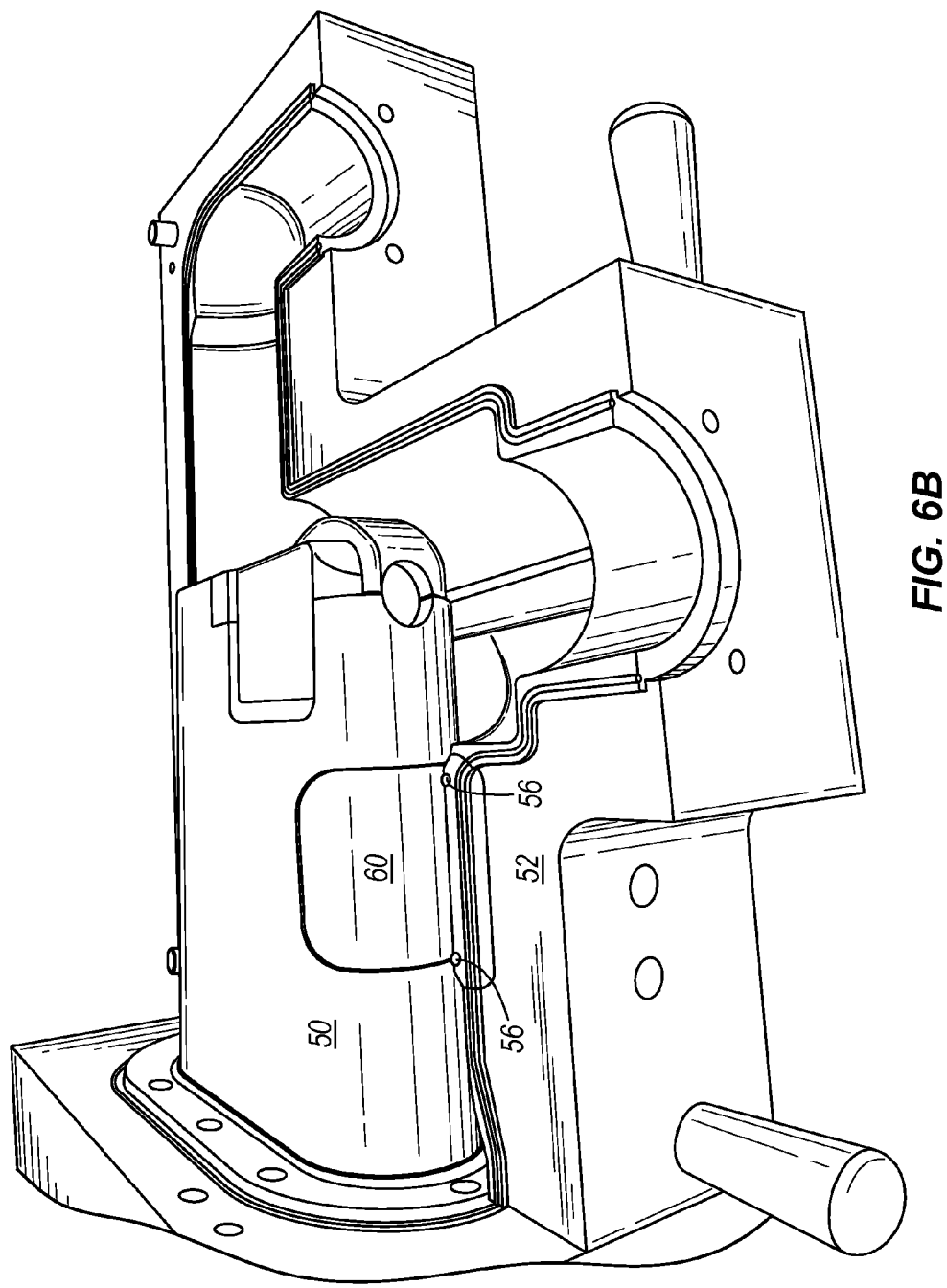
Figure 6C:
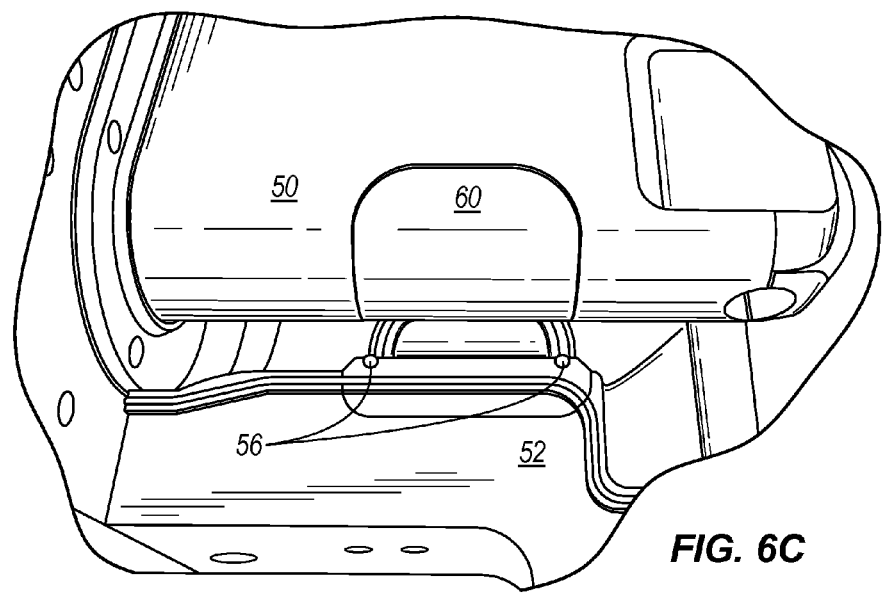
Figure 6D:
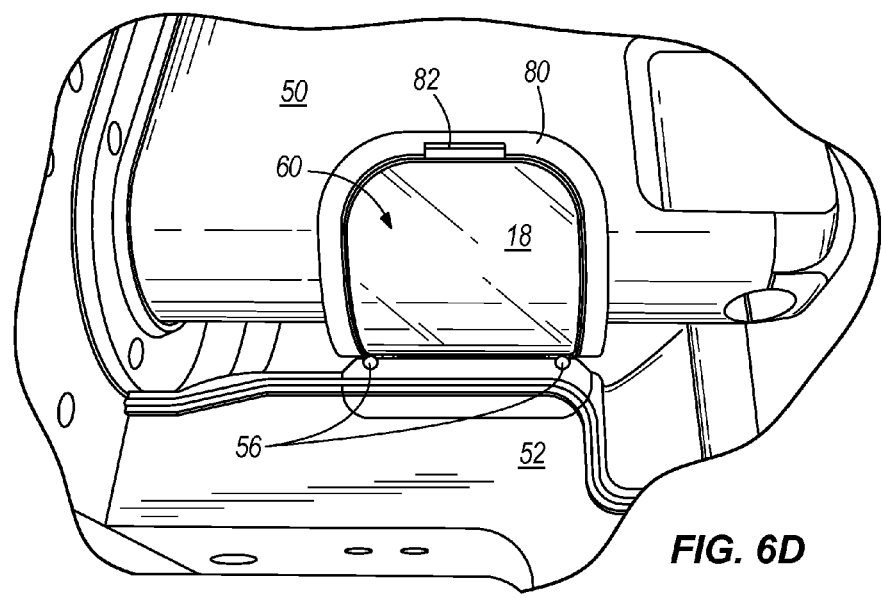

In some embodiments, the window 18 includes a protrusion 82 near one or both edges (see FIG. 5C-5E). The protrusion 82 mates with a recess 84 in the external shell 52 (see FIG. 5B). The protrusion 82 can be formed as part of the coating 80 or can be formed as a separate component (e.g., formed from an elastomeric material or other material capable of withstanding the molding process) and coupled to the window 18 before or after the coating 80 is applied.

In some embodiments, a ridge 90 is formed along the inside and outside perimeter of the viewing surfaces of the glass lens forming the window 18 (see FIGS. 5F-5H). The ridge 90 can be formed in the glass lens, and the ridge 90 increases the length of the bond line between the viewing window 18 and the epoxy forming the housing 16. Therefore, the ridge 90 provides a greater sealing distance and greater dielectric distance and also helps lock the window 18 in place within the epoxy molding. It should be understood, however, that the ridge 90 is optional and, in some embodiments, the window 18 can include a straight line bond with the epoxy.

Another method of holding the viewing window 18 between the mandrel 50 and the external shell 52 (at 44) includes using an inflatable elastomeric bladder 60 on the mandrel 50 and using an elastomeric band 56 on the shell 52 (see FIGS. 6A-6D). After the mandrel 50 is inserted into the outer shell 52, the bladder 60 is inflated (e.g., with water, air, or fluid pressure), which presses the viewing window 18 against the band 56 on the shell 52. In some embodiments, the bladder 60 is filled with a liquid, such as polyethylene glycol, that can inflate the bladder 60 and does not harm the epoxy if the liquid leaks from the bladder 60 during the molding process. The band 56 forms a seal between the outer surface of the window 18 and the external shell 52, and the bladder 60 forms a seal between the inner surface of the window 18 and the mandrel 50 to help keep epoxy from covering the viewing surface of the window 18. Once the epoxy has cured in the mold, the pressure in the bladder 60 can be released (i.e., the bladder 60 can be deflated), which allows the mandrel 50 to be removed. Use of the bladder 60 helps to control the amount of pressure on the viewing window 18, otherwise the pressure may cause the window 18 to break or become dislodged.

Figure 7:
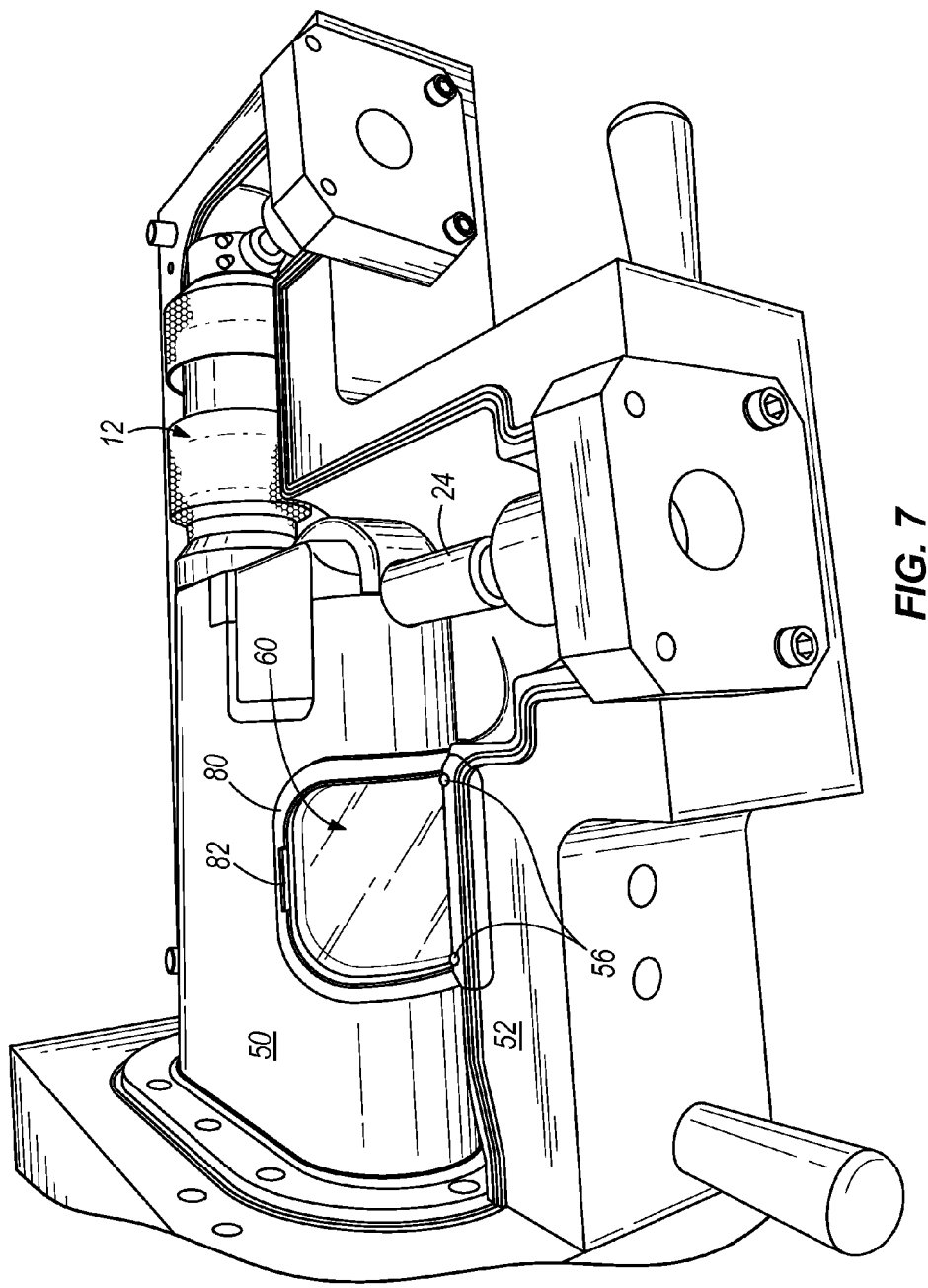
Figure 8:
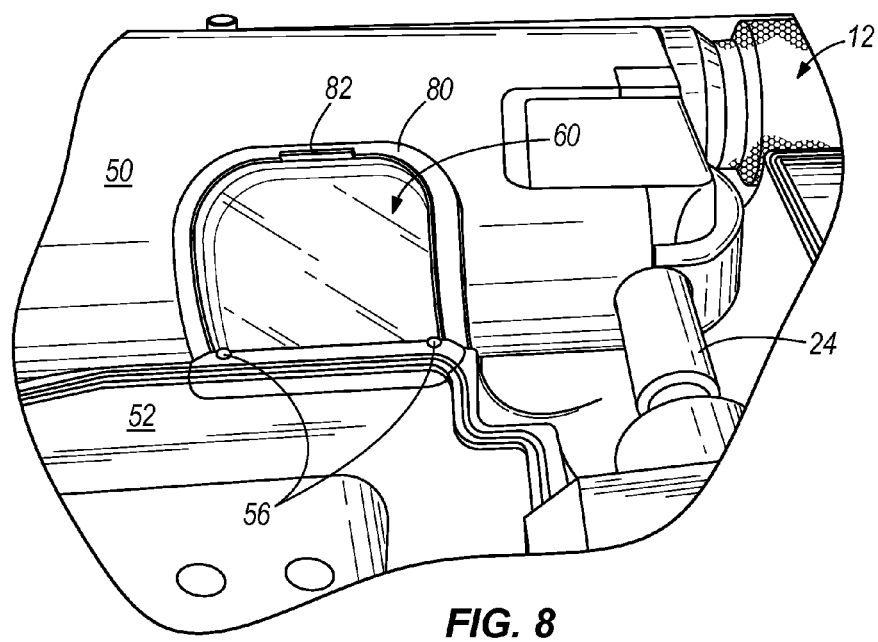
Figure 9:
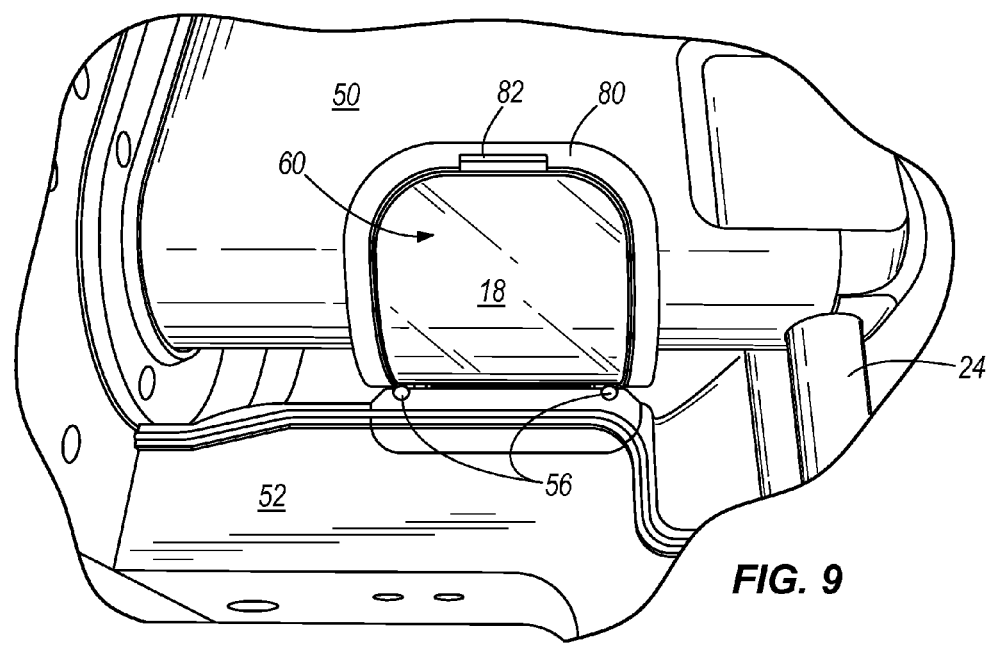

After the window 18 is sealed in place between the external shell 52 and the mandrel 50 (at 44), the internal components of the switch 10 (e.g., the vacuum interrupter 12 and the visible disconnect assembly 14) are placed in the mold (see FIGS. 7-9) (at 45). The mold can then be filled with epoxy (i.e., the area between the external shell 52 and the mandrel 50 is filled with epoxy) (at 46), and the epoxy is allowed to cure (at 47). After the epoxy has cured, the switch 10 can be removed from the mold (at 48), and the switch 10 can be assembled with other components (e.g., external operating handles for operating the drive mechanism 20 and the lever 22, interlocks for the operating handles, etc.).

Figure 11:
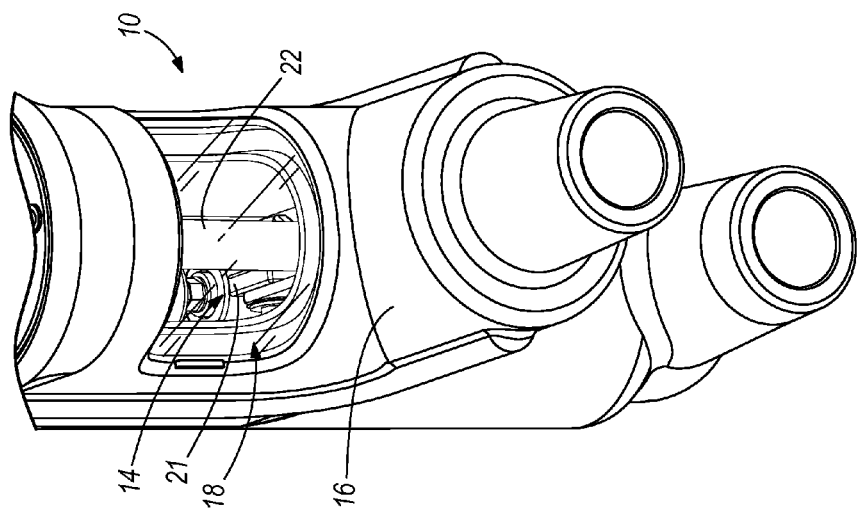
FIG. 11 is a perspective view of the switch of FIG. 1, with the visible disconnect assembly in an open state as viewed through the viewing window.
Figure 10:
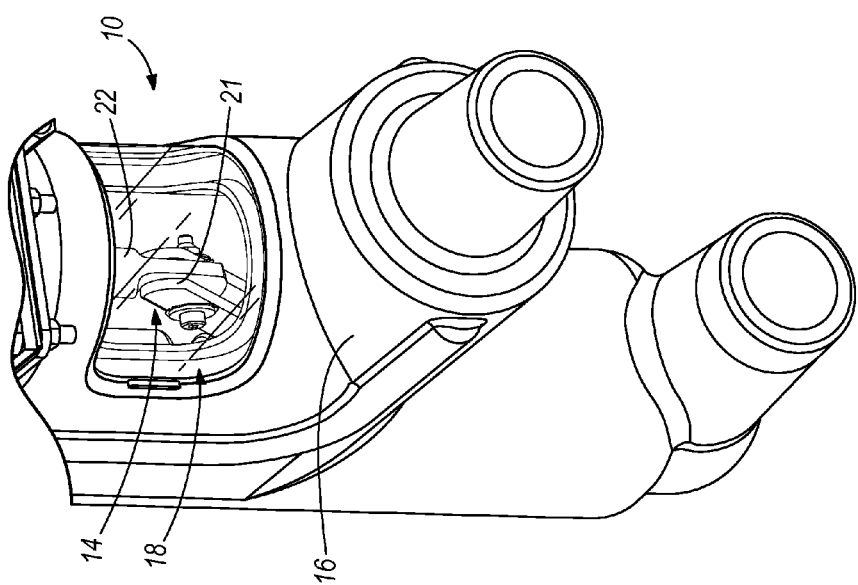
FIG. 10 is a perspective view of the switch of FIG. 1, with the visible disconnect assembly in a closed state as viewed through the viewing window.
Figure 12:
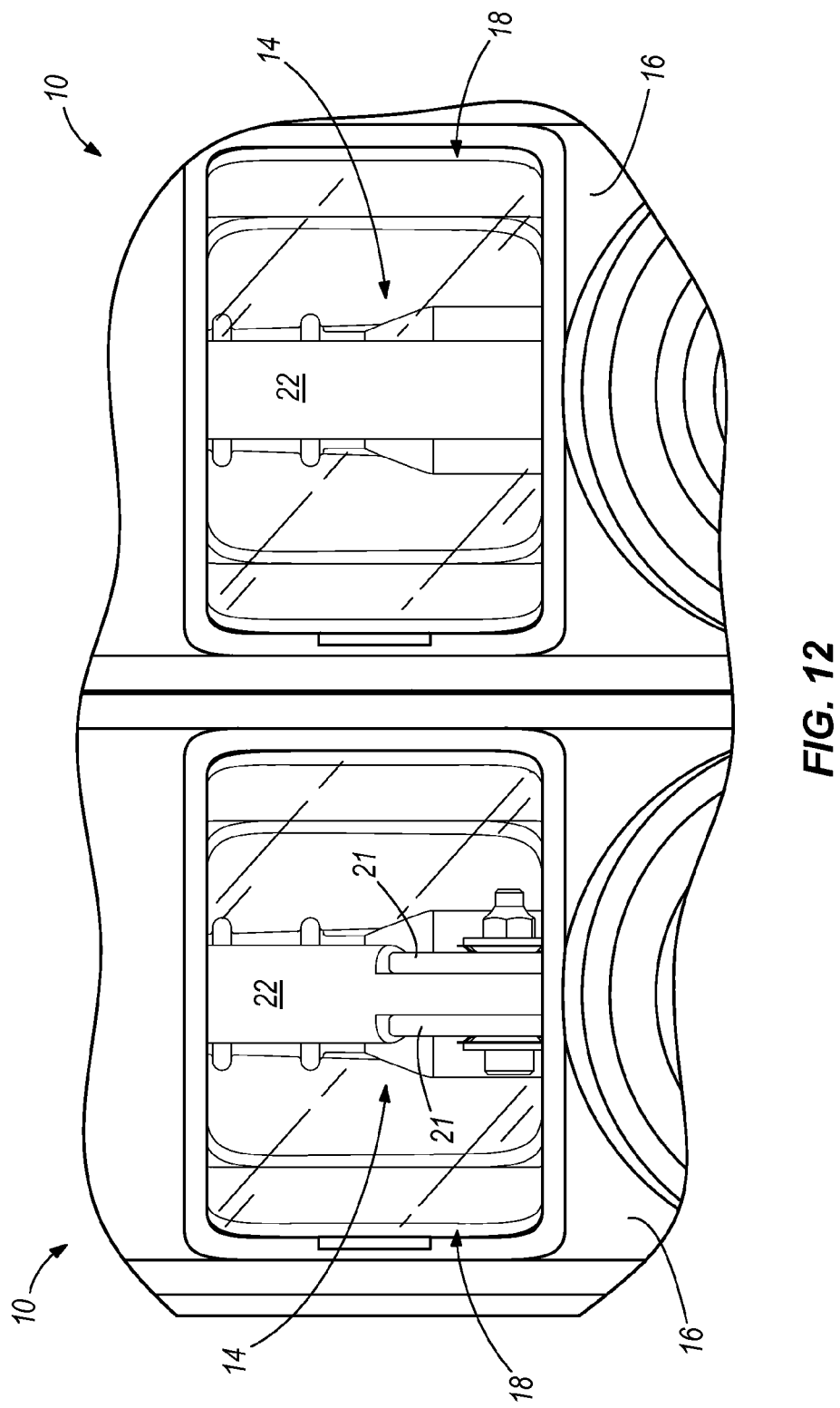
FIG. 12 are front views of the switch of FIG. 1, with the visible disconnect assembly in an open state and a closed state as viewed through the viewing window.

As shown in FIGS. 10-14, the visible disconnect assembly 14 is viewable through the viewing window 18. In particular, FIG. 10 illustrates the visible disconnect assembly 14 as viewed through the viewing window 18 when the assembly 14 is in an open state. In contrast, FIG. 11 illustrates the visible disconnect assembly 14 as viewed through the viewing window 18 when the assembly 14 is in a closed state. Therefore, as illustrated in FIG. 12, an operator can view the visible disconnect assembly 14 through the viewing window 18 to visually determine whether the assembly 14 is in an open state (i.e., the switch on the left in FIG. 12) or a closed state (i.e., the switch on the right in FIG. 12).

In some embodiments, as illustrated in FIGS. 10-14, the viewing window 18 at least partially covers a front side of the switch 10 and one or more sides of the switch 10. Thus, the viewing window 18 can provide a wide angle for viewing the visible disconnect assembly 14 inside the housing 16. The viewing window 18 can also be curved, as illustrated in FIGS. 10-14, which prevents distortions that may be caused by straight edges in the window 18. Also, it should be understood that although only a single viewing window 18 is illustrated in FIGS. 10-14 for each switch 10, the switch 10 can include multiple viewing windows 18, which allow multiple vantage points for viewing the visible disconnect assembly 14 or other components contained in the switch 10. For example, in some embodiments, regardless of whether the switch 10 includes an integral visible disconnect assembly 14, the solid-dielectric switch 10 can include a viewing window 18 as described above to allow an operator to view any internal area or component of the switch 10. Furthermore, it should be understood that the viewing window 18 and the method of molding the same can be used with any solid-dielectric switch that includes more, fewer, or different internal components than those illustrated in FIGS. 1-3. For example, the viewing window 18 can be used with other types of visible disconnect assemblies than just the knife blade assembly illustrated in FIGS. 1-3.

Figure 13:
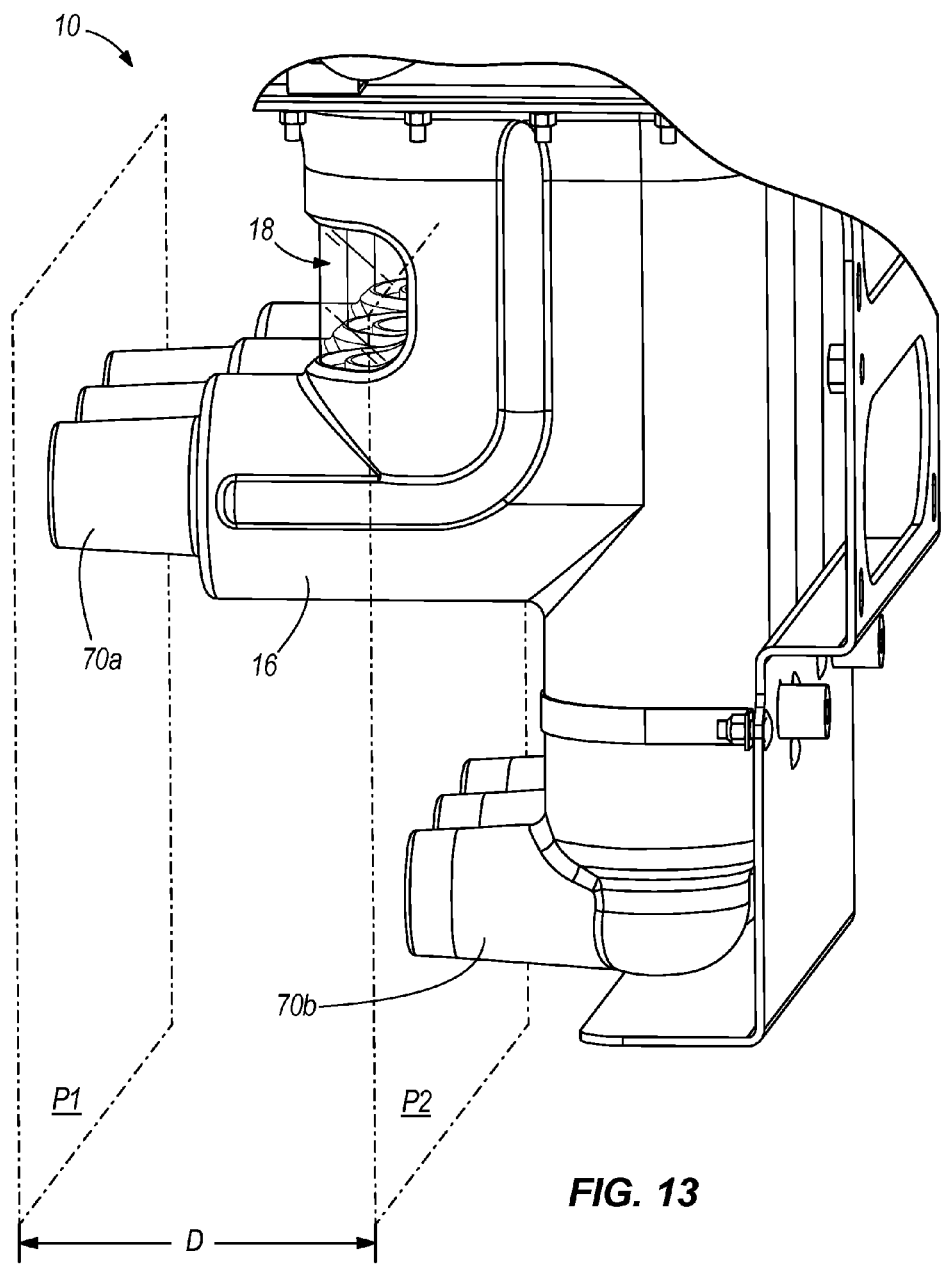
FIG. 13 is a side view of the switch of FIG. 1.

In some embodiments, the housing 16 also defines one or more connectors for connecting cables to the switch 16. For example, as illustrated in FIG. 13, in some embodiments, the housing 16 defines a first connector 70*a* and a second connector 70*b*. The first connector 70*a* can be positioned in a first plane P1 and the second connector 70*b* can be positioned in a second plane P2. The first plane P1 and the second plane P2 are different planes and are separated by an offset distance D. For example, in some embodiments, the offset distance D is approximately 5.0 inches. However, it should be understood that the offset distance D can vary depending on the configuration of the switch, the connectors, cables connected to the connectors, and the environment where the switch is located. Offsetting the connectors 70*a* and 70*b* allows for easier connection of cables to the connectors 70*a* and 70*b*. In particular, depending on the size of the cables and the size of the connectors 70*a* and 70*b*, the cables, when connected, may form a tight configuration that makes it difficult to access and remove a single cable. Therefore, offsetting the connectors 70*a* and 70*b* makes it easier to manage the cables connected to the connectors 70*a* and 70*b*.

Figure 14:
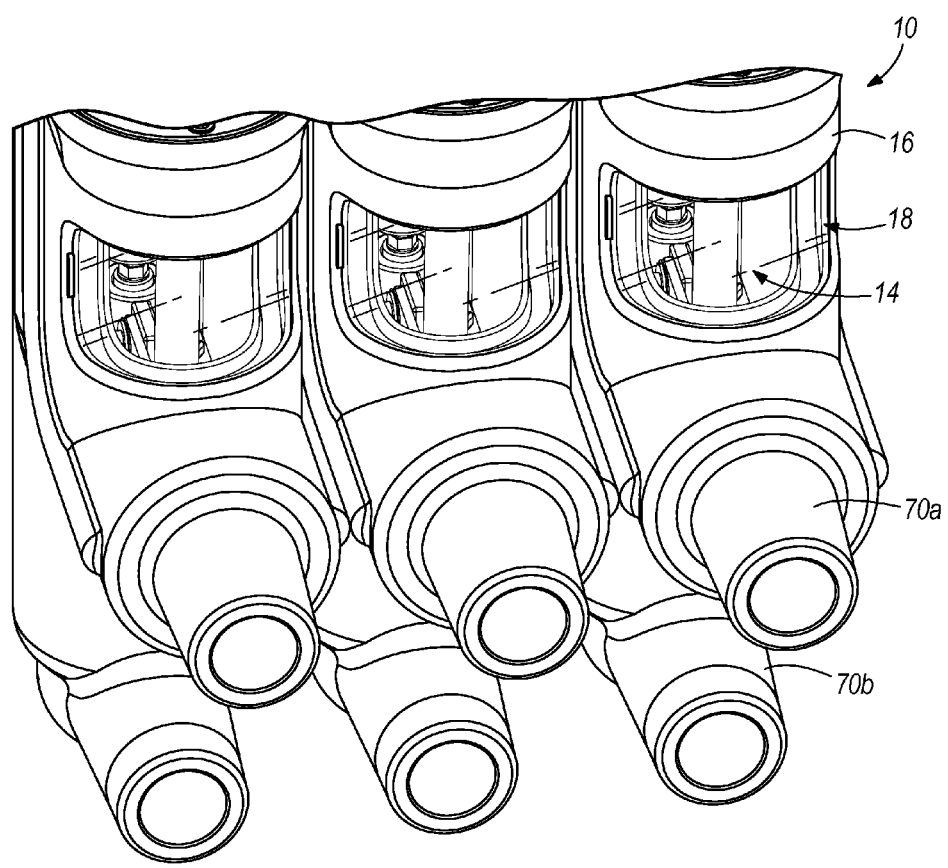
FIG. 14 is a perspective view of the switch of FIG. 1.

While the invention is described in terms of several preferred embodiments of circuit or fault interrupting devices, it will be appreciated that the invention is not limited to circuit interrupting and disconnect devices. The inventive concepts may be employed in connection with any number of devices including circuit breakers, reclosers, and the like. Also, it should be understood that the switch 10 can include a single-phase interrupting device or a multi-phase (e.g., a three phase) interrupting device, as illustrated in FIGS. 13 and 14. When a multi-phase interrupting device is used, each vacuum interrupter 12 can be associated with a separate visible disconnect assembly 14 and a separate viewing window 18. In other embodiments, the multiple vacuum interrupters 12 in a multi-phase interrupting device can be associated with one or more shared visible disconnect assemblies 14 and one or more shared viewing windows 18.

Various features and advantages of the invention are set forth in the following claims.

What is claimed is:

1. A solid-dielectric switch comprising:
   a visible disconnect assembly having an open state and a closed state;
   a molded housing at least partially encasing the visible disconnect assembly, wherein at least a portion of the molded housing forms a molded one-piece wall having an inner surface and an outer surface;
   an aperture in the molded one-piece wall, wherein the aperture extends in a first direction between the inner surface and the outer surface of the wall; and
   a viewing window disposed in the aperture and molded into the molded wall, the viewing window including a lens,
   wherein the viewing window extends into the molded one-piece wall in a second direction such that an outer edge of the viewing window is embedded within the molded one-piece wall between the inner surface and the outer surface of the molded one-piece wall.

2. The switch of claim 1, wherein the viewing window includes glass.

3. The switch of claim 1, wherein the viewing window extends over at least a portion of a front of the switch and at least a portion of a side of the switch.

4. The switch of claim 1, wherein the viewing window is curved.

5. The switch of claim 1, further comprising a load-breaking device in series with the visible disconnect assembly.

6. The switch of claim 5, wherein the load-breaking device includes a vacuum interrupter.

7. The switch of claim 1, wherein the visible disconnect assembly includes a knife blade assembly including a blade, a pivoting mechanism, and a lever, wherein the lever rotates the blade on the pivoting mechanism between the open state and the closed state.

8. The switch of claim 1, wherein the housing includes epoxy.

9. The switch of claim 1, wherein the housing defines a first connector and a second connector, the first connector positioned in a first plane and the second connector positioned in a second plane separated from the first plane by an offset distance.

10. A housing for a solid-dielectric switch with a visible disconnect assembly having an open state and a closed state, the housing comprising:
    a molded one-piece wall having an inner surface and an outer surface;
    an aperture in the molded one-piece wall, wherein the aperture extends in a first direction between the inner surface and the outer surface of the wall; and
    a viewing window disposed in the aperture, the viewing window including a lens,
    wherein the viewing window extends into the molded one-piece wall in a second direction such that an outer edge of the viewing window is embedded in the molded one-piece wall between the inner surface and the outer surface of the wall.

11. The housing of claim 10, wherein the outer edge of the viewing window is coated with an elastomeric material.

12. The housing of claim 11, wherein the elastomeric material is chosen from the group consisting of neoprene and ethylene propylene diene monomer.

13. The housing of claim 11, wherein the outer edge of the viewing window includes a protrusion formed by the elastomeric coating.

14. The housing of claim 10, wherein the outer edge of the viewing window includes a protrusion.

15. The housing of claim 10, further comprising a ridge that extends around the inside perimeter of the lens.

16. The housing of claim 10, further comprising a ridge that extends around the outside perimeter of the lens.

17. The switch of claim 10, wherein the housing defines a first connector and a second connector, the first connector positioned in a first plane and the second connector positioned in a second plane separated from the first plane by an offset distance.

* * * * *